United States Patent
Montgomery et al.

(10) Patent No.: US 7,539,358 B2
(45) Date of Patent: May 26, 2009

(54) SOI-BASED OPTO-ELECTRONIC DEVICE INCLUDING CORRUGATED ACTIVE REGION

(75) Inventors: Robert Keith Montgomery, Easton, PA (US); Vipulkumar Patel, Breinigsville, PA (US)

(73) Assignee: Lightwire Inc., Allentown, PA (US)

( * ) Notice: Subject to any disclaimer, the term of this patent is extended or adjusted under 35 U.S.C. 154(b) by 68 days.

(21) Appl. No.: 11/807,959

(22) Filed: May 31, 2007

(65) Prior Publication Data

US 2007/0297709 A1     Dec. 27, 2007

Related U.S. Application Data

(60) Provisional application No. 60/813,937, filed on Jun. 15, 2006.

(51) Int. Cl.
*G02F 1/35* (2006.01)
(52) U.S. Cl. .................. 385/2; 385/124; 385/129; 385/130; 385/131; 385/132
(58) Field of Classification Search ............ 385/2, 385/124, 129, 130, 131, 132
See application file for complete search history.

(56) References Cited

U.S. PATENT DOCUMENTS

| | | | |
|---|---|---|---|
| 6,721,081 B1 | 4/2004 | Mauro et al. | |
| 6,748,125 B2 | 6/2004 | Deliwala | |
| 6,895,148 B2 | 5/2005 | Gunn, III | |
| 7,116,853 B2 | 10/2006 | Gunn, III et al. | |
| 7,120,338 B2 | 10/2006 | Gunn, III | |
| 7,136,544 B1 | 11/2006 | Gunn, III et al. | |
| 7,155,083 B2 | 12/2006 | Baumann et al. | |
| 7,167,606 B2 | 1/2007 | Gunn, III et al. | |
| 7,190,050 B2 | 3/2007 | King et al. | |
| 7,203,403 B2 | 4/2007 | Gunn, III | |
| 2003/0142943 A1* | 7/2003 | Yegnanarayanan et al. | 385/131 |
| 2004/0258348 A1 | 12/2004 | Deliwala | |
| 2005/0089257 A1* | 4/2005 | Barrios et al. | 385/2 |
| 2005/0189591 A1* | 9/2005 | Gothoskar et al. | 257/347 |

* cited by examiner

*Primary Examiner*—James P Hughes
(74) *Attorney, Agent, or Firm*—Wendy Koba

(57) ABSTRACT

The surface silicon layer (SOI layer) of an SOI-based optical modulator is processed to exhibit a corrugated surface along the direction of optical signal propagation. The required dielectric layer (i.e., relatively thin "gate oxide") is formed over the corrugated structure in a manner that preserves the corrugated topology. A second silicon layer, required to form the modulator structure, is then formed over the gate oxide in a manner that follows the corrugated topology, where the overlapping portion of the corrugated SOI layer, gate oxide and second silicon layer defines the active region of the modulator. The utilization of the corrugated active region increases the area over which optical field intensity will overlap with the free carrier modulation region, improving the modulator's efficiency.

8 Claims, 5 Drawing Sheets

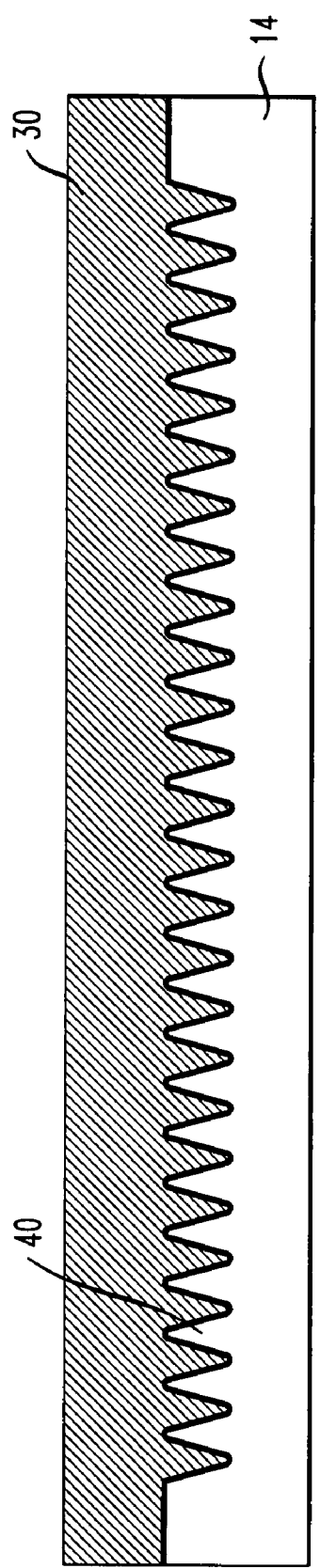
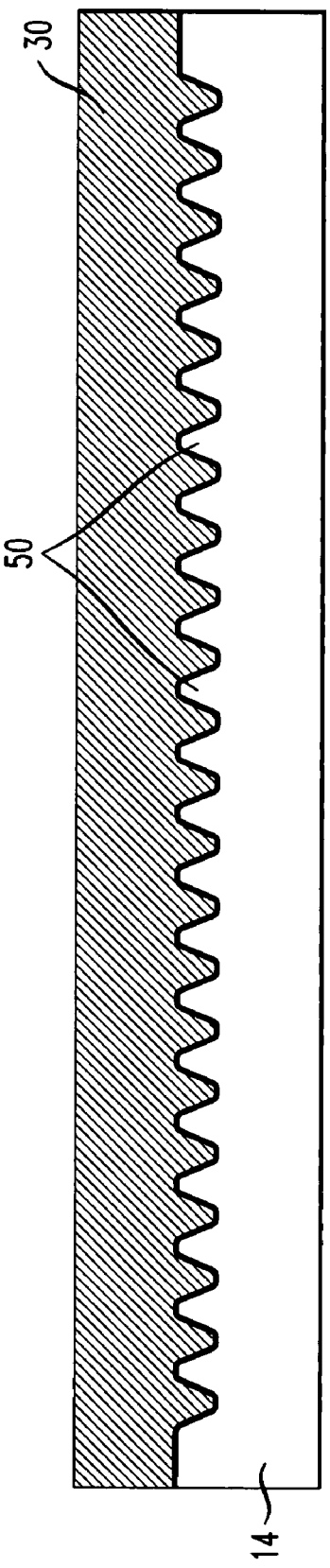

SOI-BASED OPTO-ELECTRONIC DEVICE INCLUDING CORRUGATED ACTIVE REGION

CROSS-REFERENCE TO RELATED APPLICATION

This application claims the benefit of U.S. Provisional Application No. 60/813,937, filed Jun. 15, 2006.

TECHNICAL FIELD

The present invention relates to an SOI-based opto-electronic modulator and, more particularly, to an opto-electronic modulator including a corrugated active region for increasing the area over which the optical field intensity will overlap with the free carrier movement to improve the modulator's efficiency.

BACKGROUND OF THE INVENTION

Significant advances in the ability to provide optical modulation in a silicon-based platform have been made, as disclosed (for example) in U.S. Pat. No. 6,845,198, issued to R. K. Montgomery et al. on Jan. 18, 2005 and assigned to the assignee of the present application. The Montgomery et al. modulator is based on forming a gate region of a first conductivity type to partially overlap a body region of a second conductivity type, with a relatively thin dielectric layer interposed between the contiguous portions of the gate and body regions. The doping in the gate and body regions is controlled to form lightly doped regions above and below the dielectric, thus defining the active region of the device. Advantageously, the optical electric field essentially coincides with the free carrier concentration area in the active device region. The application of an electrical modulation signal thus causes the simultaneous accumulation, depletion or inversion of free carriers on both sides of the dielectric, resulting in operation at speeds in excess of 10 GHz.

FIG. 1 illustrates one exemplary arrangement of a prior art SOI-based electro-optic modulator device 1 as disclosed in the Montgomery et al. reference. As shown, prior art modulator 1 is formed within an SOI structure 2 including a silicon substrate 3, buried oxide layer 4 and a surface silicon layer 5 (hereinafter referred to as "SOI layer 5"). In most cases, SOI layer 5 comprises single crystal silicon having a thickness less than one micron, in order to maintain the desired degree of optical mode confinement (e.g., single mode) within the completed structure. At least a portion of SOI layer 5 in the area defining the active device structure is doped to exhibit a predetermined conductivity (in this case, n-doped). A separate silicon layer 6 (usually formed of polysilicon) is disposed over the doped portion of SOI layer 5 in the overlapping manner shown in FIG. 1, where silicon layer 6 is doped to be of the opposite conductivity type (in this case, p-doped). A thin dielectric layer 7 is located between the doped polysilicon layer 6 and doped SOI layer 5, with this tri-layer structure defining the active region 8 of prior art modulator 1.

As mentioned above, free carriers will accumulate and deplete on either side of dielectric layer 7 as a function of voltages applied to SOI layer 5 (VREF5) and/or polysilicon layer 6 (VREF6). The modulation of the free carrier concentration results in changing the effective refractive index in active region 8, thus introducing phase modulation of an optical signal propagating along a waveguide formed along active region 8 (the waveguide being along the y-axis, in the direction perpendicular to the paper). FIG. 2 is a cut-away side view of structure 1 (in the y-z plane), illustrating the direction of propagation of an optical signal along the length L of active region 8 of SOI-based modulator device 1. It is clear that with this prior art structure the physical length L of active region 8 is identical to the interaction length between the optical field and free carrier modulation.

The interaction length of such a prior art device thus determines the amount of modulation that is able to be produced. In SISCAP devices, it is desired to maximize the overlap of the optical field intensity with the free carrier modulation region. Additionally, it is desirable to reduce the overall length of the device to reduce optical loss, where this requirement is seen to be at odds with the desire to increase the amount of modulation. Thus, a need remains in the art to develop a SISCAP structure that accommodates both of these concerns.

SUMMARY OF THE INVENTION

The need remaining in the art is addressed by the present invention, which relates to an SOI-based opto-electronic device utilizing the silicon-insulator-silicon capacitor (SISCAP) structure and, more particularly, to such a device including a corrugated active region for increasing the area over which optical field intensity will overlap with the free carrier modulation region.

In accordance with the present invention, the surface silicon layer (SOI layer) of an SOI structure is processed to exhibit a corrugated surface along the direction of optical signal propagation. CMOS fabrication techniques known in the art may be used to form the corrugated structure. The required dielectric layer (i.e., relatively thin "gate oxide") is formed over the corrugated structure in a manner that preserves the corrugated topology. A second silicon layer, required to form the SISCAP structure, is then formed over the gate oxide in a manner that follows the corrugated topology. The top surface of this second silicon layer is subsequently smoothed/polished to remove any vestiges of the corrugation that may remain.

The corrugated structure of the present invention increases the interaction length and thus forms a larger area over which the optical field will interact with the free carriers, significantly increasing the amount of modulation that can be obtained as a function of the physical length of the device.

Other and further advantages and arrangements of the present invention will become apparent during the course of the following discussion and by reference to the accompanying drawings.

BRIEF DESCRIPTION OF THE DRAWINGS

Referring now to the drawings,

FIG. 14 is a cut-away side view of an alternative corrugation (saw-tooth) that may be used to form the modulator of the present invention; and FIG. 15 is a cut-away side view of yet another embodiment of the present invention, including a sinusoidal topology along the active region of the modulator structure.

DETAILED DESCRIPTION

Figure 1:
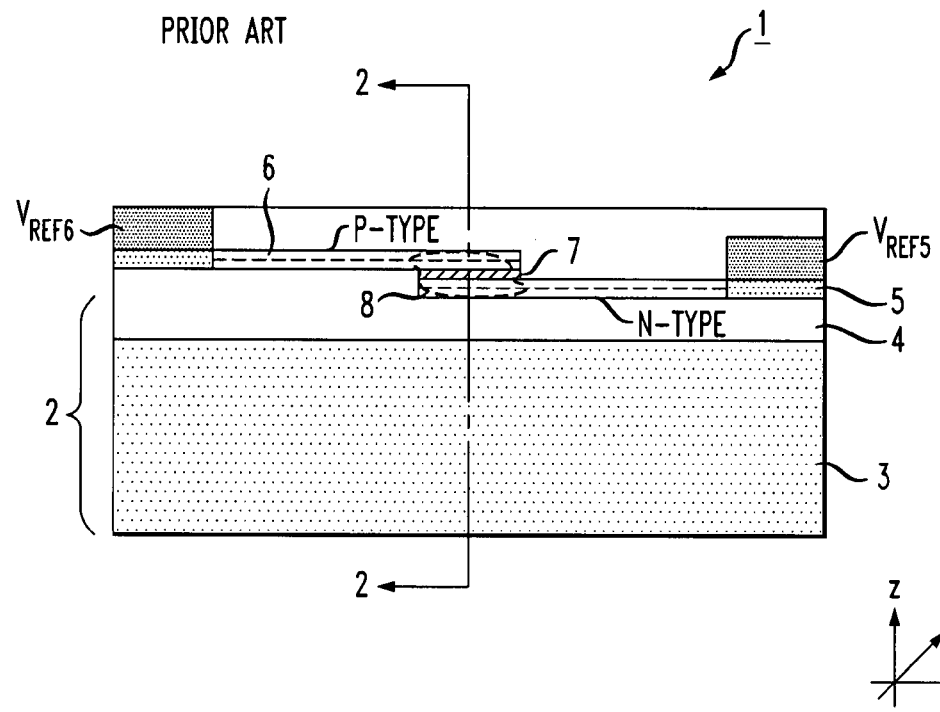
FIG. 1 is an isometric view of an exemplary prior art SISCAP optical modulator formed on an SOI structure.
Figure 2:
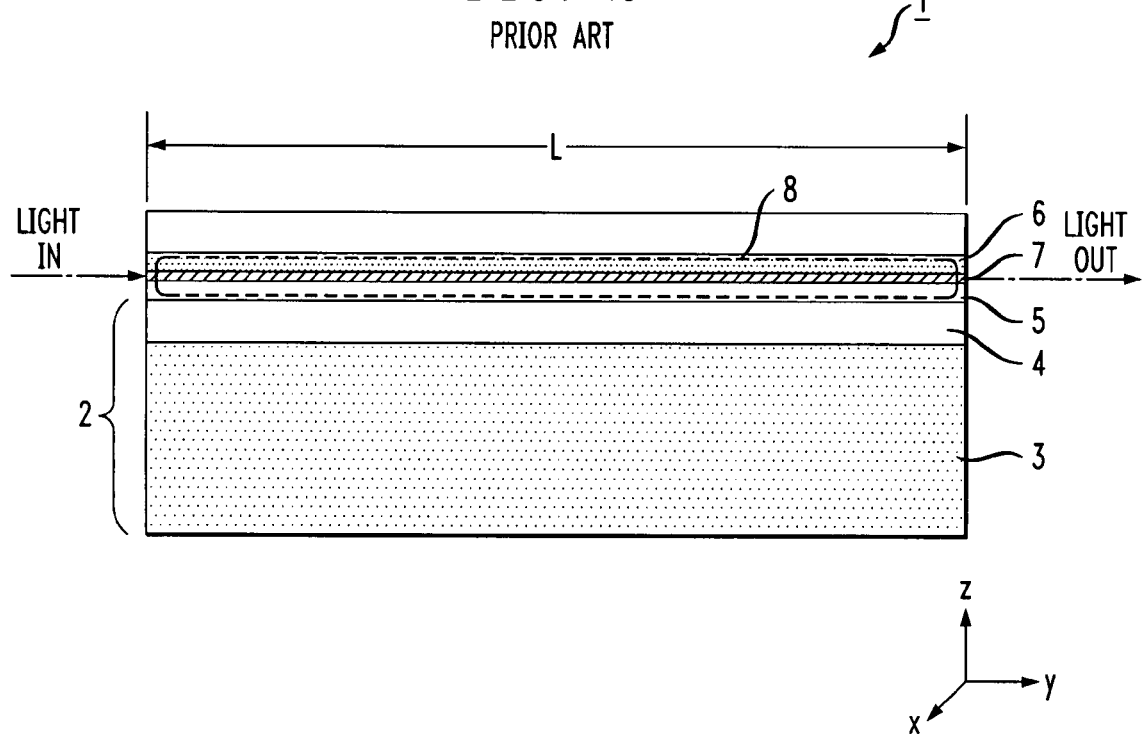
FIG. 2 is a cut-away side view of the prior art modulator of FIG. 1, taken along line 2-2.
Figure 3:
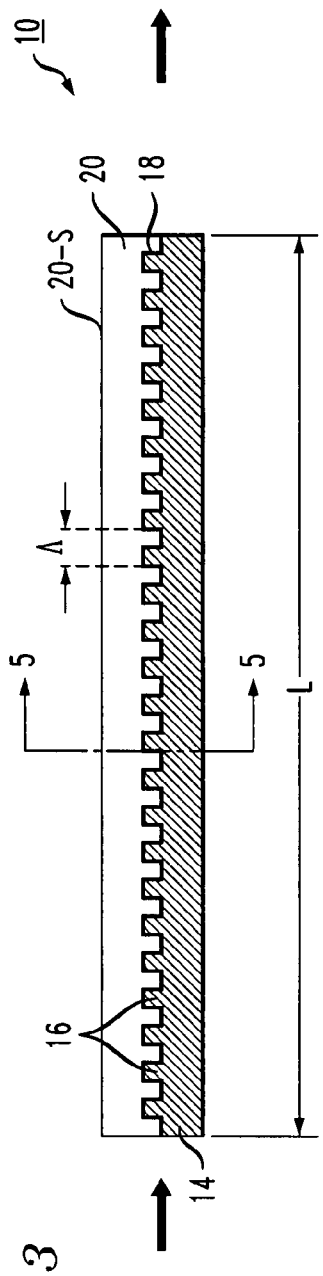
FIG. 3 is a cut-away side view of an exemplary corrugated active region of a SISCAP optical modulator formed in accordance with the present invention, taken along line 3-3 of FIG. 4.

FIG. 3 is a cut-away side view of a portion of an exemplary SISCAP modulator 10 including a corrugated active region formed in accordance with the present invention. As shown, a surface SOI layer 14 is formed to include a plurality of corrugations 16 that extend along the length L of the active region. A thin gate oxide (dielectric) layer 18 is formed to cover the top surface of SOI layer 14, including the sidewalls and top surfaces of corrugations 16. Subsequent to the formation of gate oxide layer 18, a doped polysilicon layer 20 is formed so as to "fill in" the regions between corrugations 16. Top surface 20-S of polysilicon layer 20 is thereafter polished to recreate the planar surface desired for the final device structure. Presuming that N separate raised corrugations 16 are formed in SOI layer 14, with each corrugation having a height x, an increase in optical length for free carrier interaction of approximately 2Nx is provided by the arrangement of the present invention.

Figure 4:
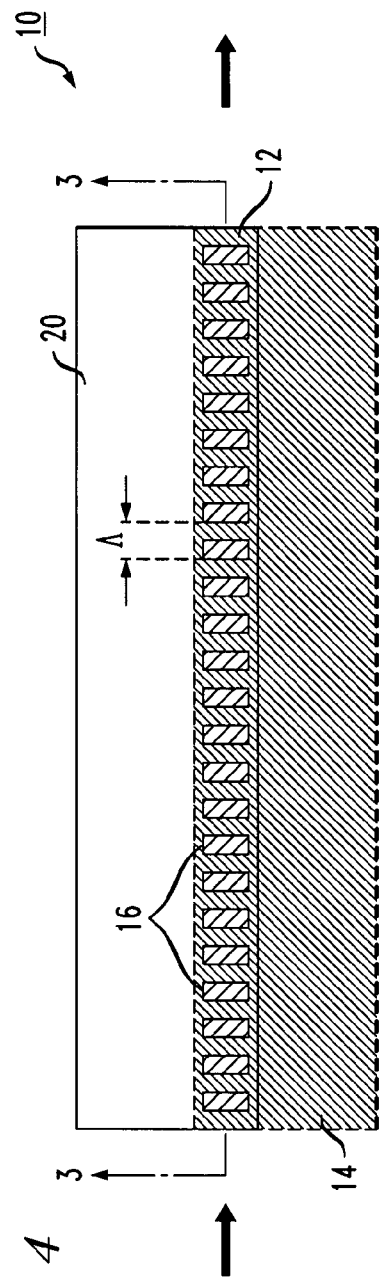
FIG. 4 is a top view of the arrangement of FIG. 3.
Figure 5:
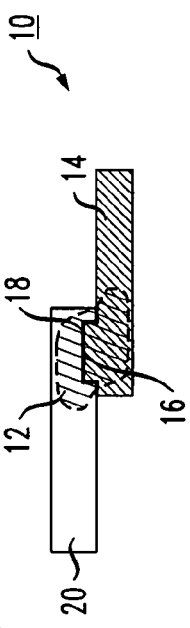
FIG. 5 is a cut-away cross-sectional view of the arrangement of FIG. 3, taken along line 5-5 of FIG. 3

FIG. 4 is a top view of the structure of FIG. 3, and FIG. 5 is a cross-sectional view along one end of the device. In both of these drawings, the location of active region 12 is clearly shown. Inasmuch as corrugations 16 are formed along the direction of signal propagation (indicated by the darkened arrows on FIGS. 3 and 4), a grating structure will inherently be formed. In order to prevent the corrugated features from generating reflected signals, it is important to maintain the spacing between adjacent corrugations 16 different from that associated with creating reflections within the propagating wavelength(s). That is, the grating period Λ should be selected to minimize resonant/phase-matched coupling into the backward mode (i.e., Bragg reflection) or coupling into the radiation modes (i.e., "grating coupling"). In a preferred embodiment, the grating period Λ should remain less than the free space propagating wavelength λ divided by the twice the effective refractive index of the optical mode (i.e., $\Lambda < \lambda/2n_{\textit{eff}}$).

Figure 6:
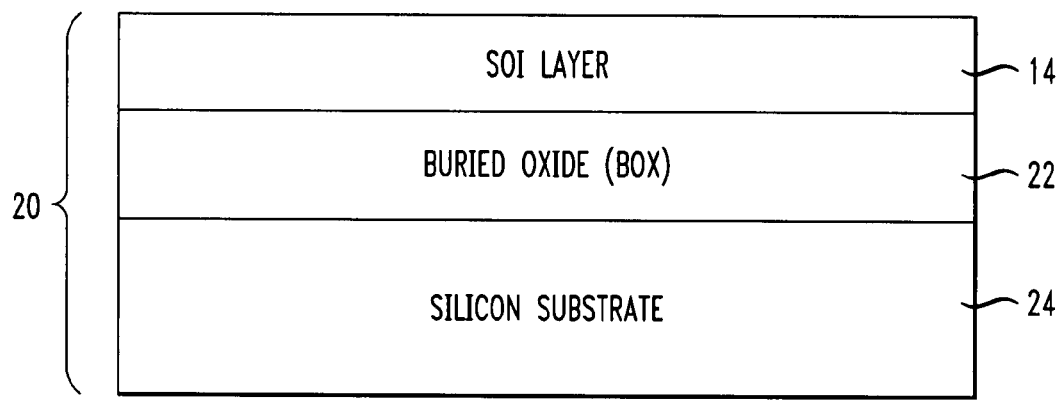
FIGS. 6-13 illustrate a series of exemplary fabrication steps used to form the corrugated structure of the present invention.
Figure 7:
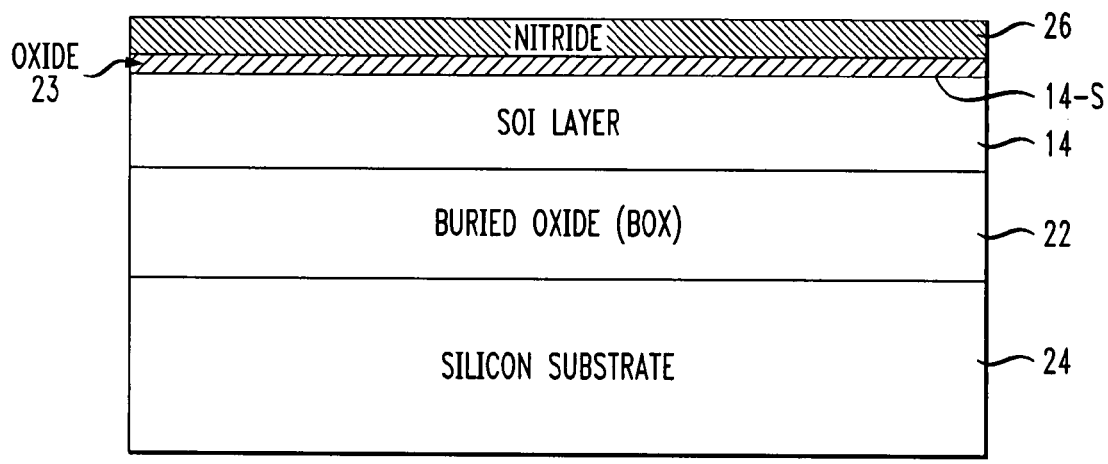

FIGS. 6-12 illustrate one exemplary method of fabricating the corrugated active region in accordance with the present invention. FIG. 6 illustrates starting material in the form of an SOI structure 20, including SOI layer 14 (in its original, planar form) disposed over buried oxide layer 22 and silicon substrate 24. An oxide layer 23 is formed in the next step, as shown in FIG. 7, where layer 23 is preferably formed utilizing a thermal oxidation technique, where top surface 14-S of SOI layer 14 is converted into silicon dioxide. Once oxide layer 23 is formed, a masking layer 26 is deposited as a thin film over oxide layer 23, resulting in the structure as shown in FIG. 7. Masking layer 26 comprises an oxygen-resistant material, where in a preferred embodiment silicon nitride may be used.

Figure 8:
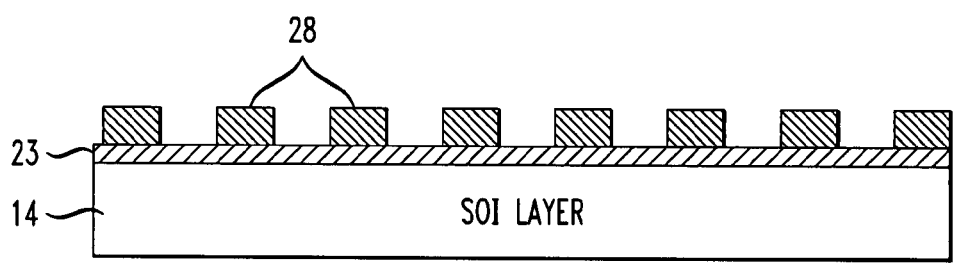

Masking layer 26 is subsequently patterned and etched, using conventional CMOS fabrication techniques, to form the structure as shown in FIG. 8 (in this and remaining illustrations, silicon substrate 24 and buried oxide layer 22 are not shown, merely for simplifying the drawings). The remaining masking layer features 28 will be used to define, as shown below, the sidewall locations for the corrugations ultimately formed in SOI layer 14.

Figure 9:
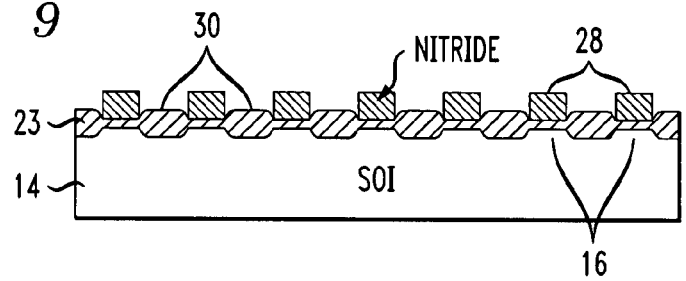

In the next step in the fabrication process, an oxidation process is used, as shown in FIG. 9, to create oxide regions 30 between each pair of features 28. Preferably, a LOCOS (local oxidation) process is used. The local oxidation process will consume a portion of underlying SOI layer 14, thus forming the desired corrugated structure of the present invention, shown as silicon corrugations 16.

Figure 10:
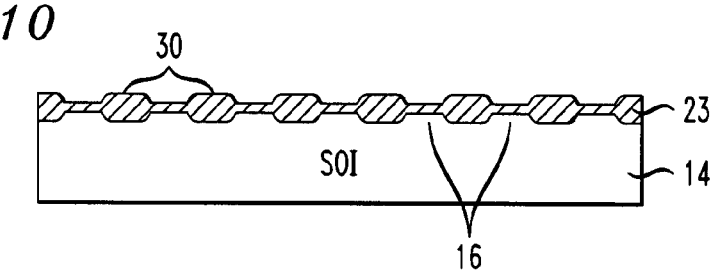
Figure 11:
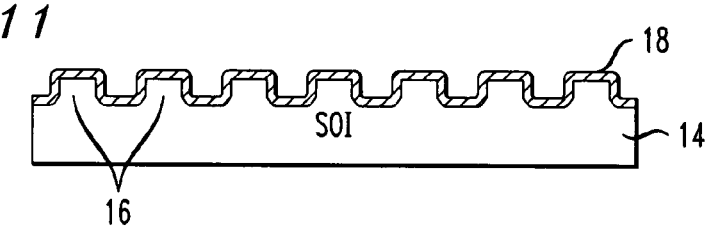

Subsequent to the local oxidation process, masking layer features 28 are removed, leaving the structure as shown in FIG. 10. Afterward, underlying oxide regions 30 are also removed (usually, by an etching process), and a relatively thin gate dielectric layer suitable for use as gate layer 18 in the inventive structure is formed. Gate dielectric layer 18 may comprise an oxide, silicon nitride, or any other material having a high κ dielectric value. FIG. 11 illustrates the device at this point in the process.

As an alternative, or in conjunction with the local oxidation process, a plasma etching process may be used (for example, a reactive ion etching process) to form the corrugated structure. The etching may be used to form corrugated features of a greater depth than may be accomplished using only oxidation.

Figure 12:
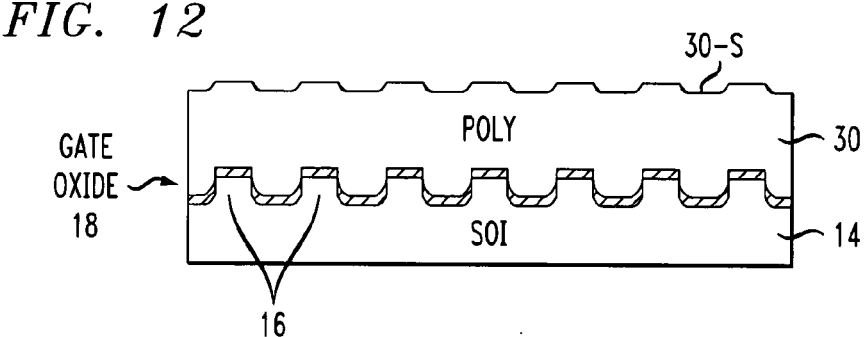
Figure 13:
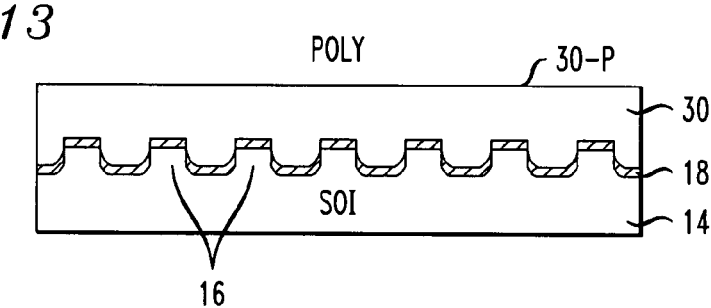

Once thin gate oxide layer 18 is created, a polysilicon layer 30 is deposited thereover, where top surface 30-S of polysilicon layer 30 will exhibit undulations as a result of growing over the non-planar structure of SOI layer 14 and gate oxide layer 18, as shown in FIG. 12. Polysilicon layer 30 is thereafter subjected to an etching/polishing process (using, for example, a chemical-mechanical planarization (CMP) process) to recreate the desired planar top surface, shown as top surface 30-P in FIG. 13. Polysilicon layer 30 may be doped at any appropriate point along the fabrication process, either prior to or subsequent to the polishing process.

While the above-described embodiment illustrates the formation of a corrugated structure having an essentially squared profile (i.e., "square-tooth corrugation"), it is to be understood that various other corrugated topologies may also be formed within the surface SOI layer and used to extend the optical length (interaction region) of the active optical device. For example, FIG. 14 illustrates a saw-tooth profile active region, including triangular corrugations 40 formed within SOI layer 14. FIG. 15 illustrates a sinusoidal profile active region, including rounded corrugations 50 within SOI layer 14. Indeed, virtually any topology that may be created within top surface 14-S of SOI layer 14 may be used.

Although the present invention has been shown and described with respect to several preferred embodiments, it is to be understood that various changes, modifications, additions, etc. may be made in the form and detail thereof without departing from the spirit and scope of the invention as defined by claims appended hereto.

What is claimed is:

1. A silicon-on-insulator (SOI)-based optical modulator including
    a surface silicon waveguiding layer (SOI layer) disposed over an insulating layer covering a silicon substrate, the SOI layer having a top major surface corrugated along a portion thereof in the direction of optical signal propagation;
    a thin gate dielectric layer formed over the corrugated top major surface of the SOI layer; and
    a silicon layer disposed over a portion of the thin gate dielectric layer to form an overlapped area within the SOI layer, the overlapped area defining an active region of the device for supporting the modulation of a propagation optical signal wherein the corrugated portion of the top major surface of the SOI layer is located within the active region and forms an extended area for overlap between the optical field intensity and the generated free carriers, increasing modulation efficiency.

2. An SOI-based optical modulator as defined in claim 1 wherein the thin gate dielectric layer comprises silicon dioxide.

3. An SOI-based optical modulator as defined in claim 1 wherein the corrugated surface of the SOI layer comprises a plurality of corrugated features.

4. An SOI-based optical modulator as defined in claim 3 wherein the plurality of corrugated features are disposed as a grating structure exhibiting a period $\Lambda$ less than the value of $\lambda/2n_{eff}$, where $\lambda$ is defined as the free space wavelength of the optical signal propagating along the SOI-based optical modulator and $n_{eff}$ is defined as the effective refractive index of the associated optical mode.

5. An SOI-based optical modulator as defined in claim 1 wherein the corrugated portion of the SOI layer top major surface comprises a plurality of essentially square-tooth corrugation features.

6. An SOI-based optical modulator as defined in claim 1 wherein the corrugated portion of the SOI layer top major surface comprises a plurality of essentially saw-tooth corrugation features.

7. An SOI-based optical modulator as defined in claim 1 wherein the corrugated portion of the SOI layer top major surface comprises a plurality of essentially sinusoidal corrugation features.

8. An SOI-based optical modulator as defined in claim 1 wherein the silicon layer disposed over the thin dielectric layer is formed to exhibit a planar top surface, any vestiges of corrugation eliminated therefrom.

* * * * *